United States Patent
Saito et al.

(10) Patent No.: US 8,652,695 B2
(45) Date of Patent: Feb. 18, 2014

(54) FUEL CELL SYSTEM CONDENSING HEAT EXCHANGER

(75) Inventors: Kazuo Saito, Glastonbury, CT (US); John W. Kowalski, Chicopee, MA (US); Bryan F. Dufner, West Hartford, CT (US); Sitaram Ramaswamy, West Hartford, CT (US)

(73) Assignee: Clearedge Power Corporation, South Windsor, CT (US)

( * ) Notice: Subject to any disclaimer, the term of this patent is extended or adjusted under 35 U.S.C. 154(b) by 172 days.

(21) Appl. No.: 13/258,755

(22) PCT Filed: Apr. 13, 2009

(86) PCT No.: PCT/US2009/040329
§ 371 (c)(1), (2), (4) Date: Sep. 22, 2011

(87) PCT Pub. No.: WO2010/120276
PCT Pub. Date: Oct. 21, 2010

(65) Prior Publication Data
US 2012/0021310 A1 Jan. 26, 2012

(51) Int. Cl.
*H01M 8/04* (2006.01)
*H01M 8/06* (2006.01)
*H01M 8/08* (2006.01)
*H01M 8/24* (2006.01)

(52) U.S. Cl.
USPC .......... 429/414; 429/415; 429/434; 429/454; 429/500

(58) Field of Classification Search
USPC ......... 429/516, 436, 450, 439, 431, 414, 434, 429/415, 500; 95/92, 228; 62/285
See application file for complete search history.

(56) References Cited

U.S. PATENT DOCUMENTS 3,948,624 A * 4/1976 Fornoff et al. ............. 95/92
4,372,759 A * 2/1983 Sederquist et al. ......... 95/228

(Continued)

FOREIGN PATENT DOCUMENTS

JP   06052879 A    2/1994
JP   06-084538     3/1994

(Continued)

OTHER PUBLICATIONS

Machine Translation of: JP 06/052879 A, Sugiyama, Feb. 25, 1994.*

(Continued)

*Primary Examiner* — Kenneth Douyette
(74) *Attorney, Agent, or Firm* — Carlson, Gaskey & Olds, P.C.

(57) ABSTRACT

A fuel cell system is disclosed that includes a heat exchanger having first and second heat exchanger portions arranged in a fluid flow passage. The second heat exchanger portion is arranged downstream from the first heat exchanger portion. The first and second heat exchanger portions include a coolant flow passage and are configured to transfer heat between the fluid flow and coolant flow passages. The first heat exchanger portion includes a first corrosion-resistant material and the second heat exchanger portion includes a second corrosion-resistant material that is less corrosion-resistant than the first corrosion-resistant material. A collector, which includes a tray and/or a mist trap, is configured to collect acid in the first heat exchanger portion from a gas stream in the fluid flow passage. Collected acid can be sprayed into a gas stream upstream from a flow field of the fuel cell.

18 Claims, 2 Drawing Sheets

(56) References Cited

U.S. PATENT DOCUMENTS

| | | | |
|---|---|---|---|
| 4,530,887 A * | 7/1985 | Maru et al. | 429/516 |
| 4,533,607 A * | 8/1985 | Sederquist | 429/436 |
| 4,808,492 A * | 2/1989 | Uozumi et al. | 429/450 |
| 2002/0142201 A1 * | 10/2002 | Nelson | 429/26 |
| 2004/0224206 A1 * | 11/2004 | Matsumoto et al. | 429/32 |
| 2004/0244398 A1 * | 12/2004 | Radermacher et al. | 62/285 |

FOREIGN PATENT DOCUMENTS

| | | |
|---|---|---|
| JP | 06186732 A | 6/1994 |
| JP | 08017454 A | 1/1996 |
| JP | 10012259 A | 1/1998 |
| KR | 10 1998 066230 | 10/1998 |
| KR | 10 2000 0000630 | 1/2000 |

OTHER PUBLICATIONS

Machine Translation of: JP 10/012259 A, Sugiyama, Jan. 16, 1998.*

Notification Concerning Transmittal of International Preliminary Report on Patentability (Chapter 1 of the Patent Cooperation Treaty) mailed on Oct. 27, 2011 for PCT/US2009/040329.

International Search Report and Written Opinion for International Application No. PCT/US2009/040329 mailed Jan. 14, 2010.

* cited by examiner

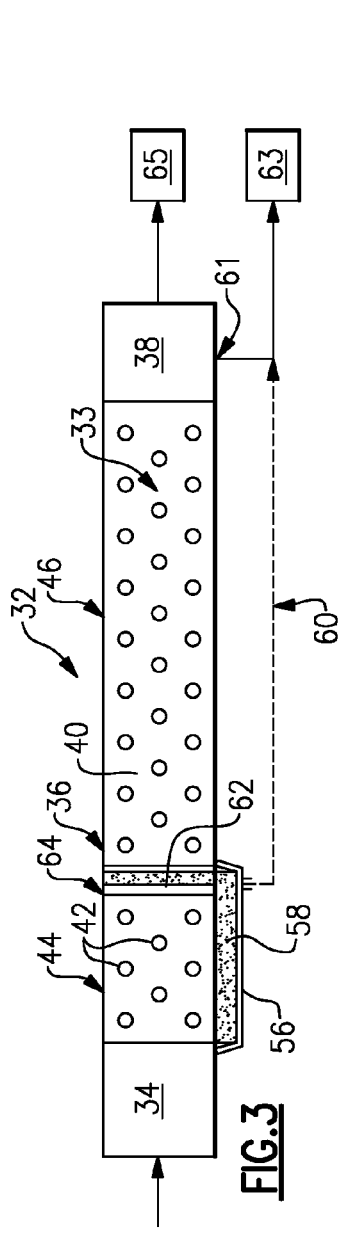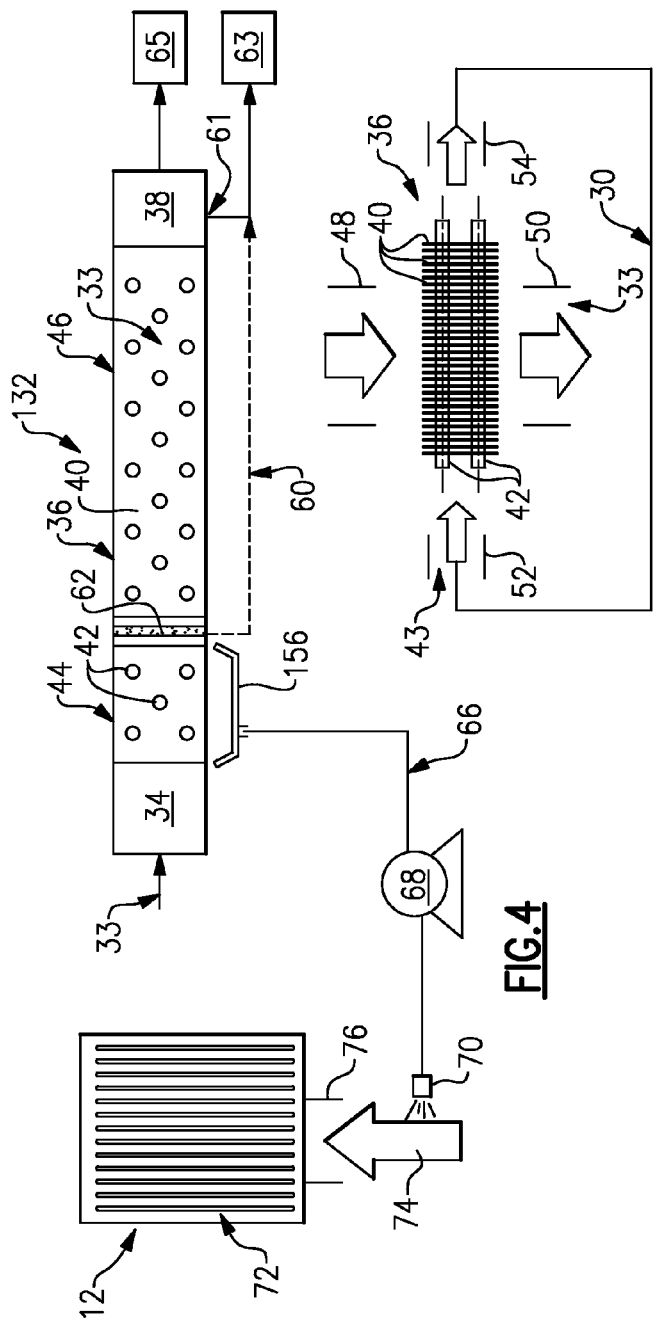

FUEL CELL SYSTEM CONDENSING HEAT EXCHANGER

BACKGROUND

This disclosure relates to an acid fuel cell system, such as a phosphoric acid electrolyte fuel cell. More particularly, the disclosure relates to a condensing heat exchanger for use in an acid fuel cell system.

One type of acid fuel cell uses a phosphoric acid electrolyte. Typically, a condenser is used in conjunction with the phosphoric acid fuel cell to condense and remove water from a gas stream, such as anode or cathode exhaust. One type of condenser heat exchanger uses multiple tubes supported in multiple fins. A coolant flows through the tubes to condense water from the gas stream flowing between the fins.

The water vapor in the gas stream includes a small amount of phosphoric acid. The heat transfer fins at an upstream portion of the condenser heat exchanger have exhibited corrosion due to acid condensation on the fins. Accordingly, the corrosion products must be removed during a maintenance procedure to prevent the fins from becoming blocked, which could inhibit the gas stream flow through the condenser heat exchanger. Corrosion-resistant metals, such as stainless steel and HASTELLOY, have been used for the fins and tubes. Use of corrosion-resistant metals has not extended the maintenance interval for removing corrosion products from the condenser heat exchanger to a desired duration, which may be ten years or more.

What is needed is a condensing heat exchanger for an acid fuel cell system that has increased corrosion resistance and an extended service life.

SUMMARY

A fuel cell system is disclosed that includes a heat exchanger having first and second heat exchanger portions arranged in a fluid flow passage. The second heat exchanger portion is arranged downstream from the first heat exchanger portion. The first and second heat exchanger portions include a coolant flow passage and are configured to transfer heat between the fluid flow and coolant flow passages. The first heat exchanger portion includes a first corrosion-resistant material and the second heat exchanger portion includes a second corrosion-resistant material that is less corrosion-resistant than the first corrosion-resistant material. A collector, which includes a tray and/or a mist trap, is configured to collect acid in the first heat exchanger portion from a gas stream in the fluid flow passage. Collected acid can be sprayed into a gas stream upstream from a flow field of the fuel cell.

Accordingly, the condensing heat exchanger provides increased corrosion resistance and an extended service life.

These and other features of the disclosure can be best understood from the following specification and drawings, the following of which is a brief description.

BRIEF DESCRIPTION OF THE DRAWINGS

FIG. 2 is a partial elevational view of a portion of the condensing heat exchanger shown in FIG. 1, in accordance with an embodiment of the present disclosure.

FIG. 3 is a schematic view of one example condensing heat exchanger, in accordance with an embodiment of the present disclosure.

FIG. 4 is a schematic view of another example condensing heat exchanger, in accordance with an embodiment of the present disclosure.

DETAILED DESCRIPTION

Figure 1:
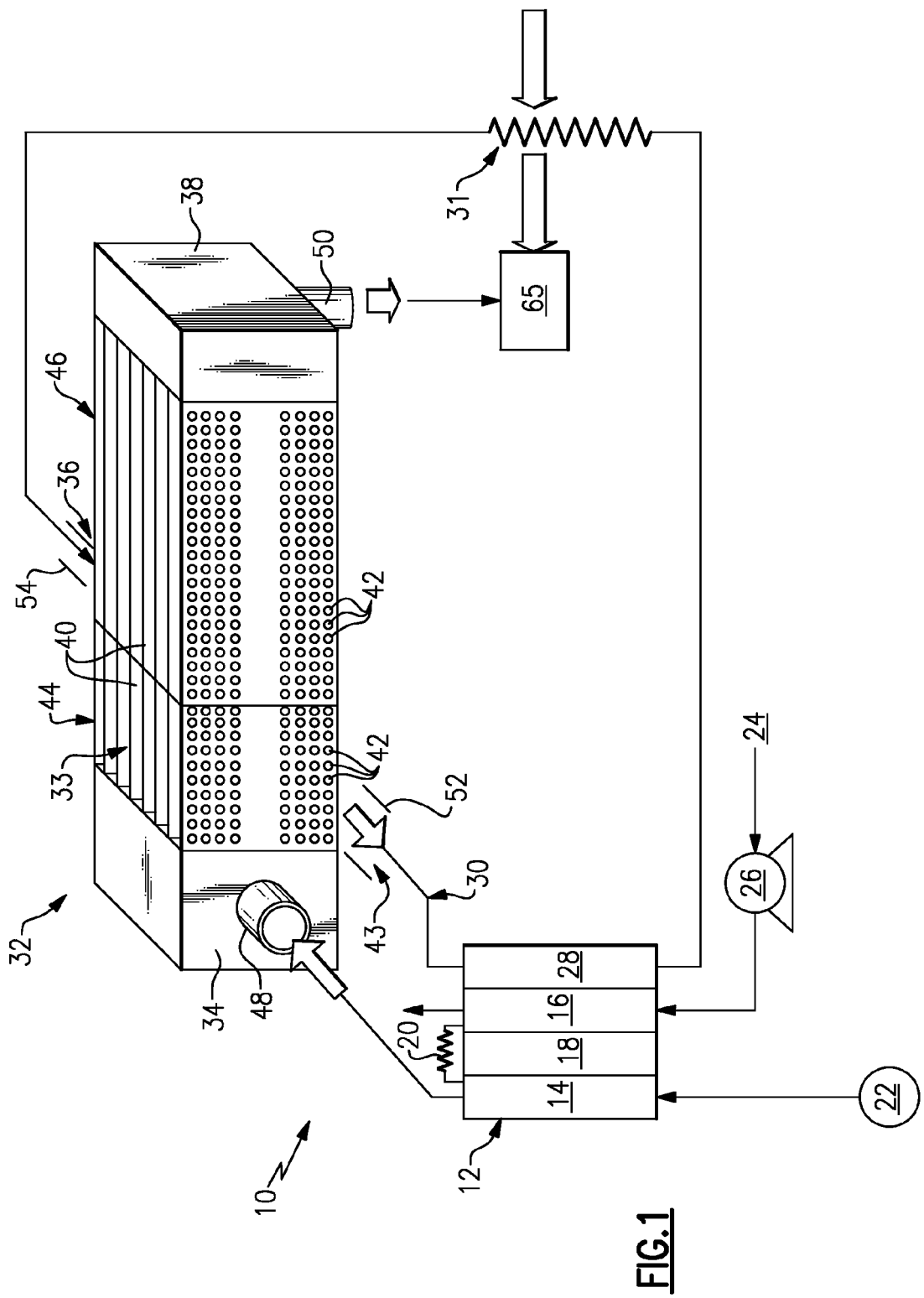
FIG. 1 is a schematic view of a portion of an acid fuel cell system having a condensing heat exchanger, in accordance with an embodiment of the present disclosure.

A fuel cell system 10 is depicted in a schematic fashion in FIG. 1. The fuel cell system 10 includes a cell stack assembly 12 having an anode 14 and a cathode 16. In one example, a phosphoric acid electrolyte 18 is arranged between the anode 14 and the cathode 16. The cell stack assembly 12 produces electricity to power a load 20 through an electrochemical reaction. A fuel source 22 supplies hydrogen to a fuel flow field provided by the anode 14. In one example, the fuel source is a natural gas. Components, such as a desulfurizer, a reformer, and a saturator, may be arranged between the fuel source 22 and the anode 14 to provide a clean source of hydrogen. An oxidant source 24, such as air, is supplied to an oxidant flow field provided by the cathode 16 using a blower 26.

The cell stack assembly 12 includes a coolant plate 28, in one example, to cool the cell stack assembly 12 to desired temperature. A coolant loop 30 is in fluid communication with the coolant plate 28 and a condensing heat exchanger 32. A heat exchanger 31 is arranged in the coolant loop 30 to reject heat from the fuel cell system 10 to ambient 65. A gaseous stream containing water vapor flows through the condensing heat exchanger 32. In one example, the gaseous stream is provided by anode exhaust from the anode 14. However, it should be understood that a condensing heat exchanger 32 can also be used in connection with the cathode 16. In one example, the exhaust gas is purged to the outside, and water that is recovered is reused for a reformer, for example. Although not shown, the coolant loop 30 can include a radiator that removes heat from the coolant loop and the condenser cooling loop. In the example, a secondary cooling loop having two heat exchangers and a radiator with a pump can be used.

The condensing heat exchanger 32 includes an inlet manifold 34 receiving the gaseous stream. The gaseous stream flows through a housing 36 to an outlet manifold 38. First and second heat exchanger portions 44, 46 are arranged within the housing 36. The first and second heat exchanger portions 44, 46 provide a fluid flow passage 33 that receives the gaseous stream. In one example, the first and second heat exchanger portions 44, 46 are provided by a tube-in-fin type arrangement. More specifically, the first and second heat exchanger portions 44, 46 include fins 40 that support tubes 42, as best seen in FIG. 2. In one example, the tubes 42 are illustrated in a horizontal orientation. The fins 40 are illustrated in a vertical orientation such that the tubes 42 are perpendicular to the fins 40. The tubes 42 provide a coolant flow passage 43 that extends between a coolant inlet 52 and coolant outlet 54, which are arranged within the coolant loop 30. The fins 40 are spaced apart from and parallel with one another to provide the fluid flow passage 33, which extends between gas inlet 48 and gas outlet 50. The tubes 42 and fins 40 can be oriented differently than shown and still fall within the scope of the claims.

In addition to containing water vapor, the gas stream also contains a small amount of phosphoric acid. Phosphoric acid has a dew point of approximately 160° C., and water vapor has a dew point of approximately 65° C. within the condensing heat exchanger 32. Coolant flow through the coolant flow passage 43 condenses the phosphoric acid and water vapor within the fluid flow passage 33 onto the exterior of the tubes 42.

The phosphoric acid tends to condense upstream from where the water vapor condenses due to the difference in dew points between phosphoric acid and water. Some water vapor may condense with the acid producing a diluted phosphoric acid. To this end, the disclosed heat exchanger uses a first heat exchanger portion 44 constructed from a first corrosion-resistant material, and the second heat exchanger portion 46 is constructed from a second corrosion-resistant material that is less corrosion-resistant than the first corrosion-resistant material. As a result, the first heat exchanger portion 44, which is arranged upstream from the second heat exchanger portion 46 is better able to withstand the corrosive properties of the condensed phosphoric acid. In one example, at least portions of the first and second heat exchanger portions 44, 46, such as the tubes 42 and fins 40, are constructed from a carbon steel, which has a higher thermal conductivity than stainless steel. The first heat exchanger portion 44 also includes a corrosion-resistant coating over the substrate provided by the carbon steel. In one example, the corrosion-resistant coating is a polytetrafluoroethylene, such as TEFLON. The second heat exchanger portion 46 may be left uncoated. The first heat exchanger portion 44 is designed to extend a length within which a substantial amount of the phosphoric acid condenses.

Referring to FIG. 3, one or more collectors are used to collect the phosphoric acid. In one example, a tray 56 is arranged beneath the first heat exchanger portion 44 to collect the condensed acid. In one example, the tray 56 includes an acid neutralizing material 58 that neutralizes the acid, countering undesired effects of the acid on the condensing heat exchanger 32. In one example, a water remaining from the neutralized phosphoric acid can be supplied to a water return passage 60. The outlet manifold 38 includes a drain 61, for example, that is fluidly connected to the water return passage 60. In one example, the acid neutralizing material 58 is a piece of sacrificial metal intended to react with the phosphoric acid. In another example, the acid neutralizing material 58 is a chemical neutralizer.

In another example, a collector is provided using a mist trap 62 arranged in a gap 64 separating the first and second heat exchanger portions 44, 46. The mist trap 62 collects the phosphoric acid and prevents the acid from flowing into the second heat exchanger portion 46, which is constructed from less corrosion-resistant material than the first heat exchanger portion. Any water produced at the mist trap 62 can be provided to the water return passage 60.

Another example condensing heat exchanger 132 is shown in FIG. 4. In the example shown, the tray 156 supplies the condensed phosphoric acid to an acid return line 66. A pump 68 supplies the acid from the acid return line 66 to a sprayer 70. The sprayer 70 sprays the acid into a gas stream 74 that is arranged upstream from a gas flow field 72 within the cell stack assembly 12. In one example, the gas flow field 72 is an anode flow field provided by the anode 14.

Although example embodiments have been disclosed, a worker of ordinary skill in this art would recognize that certain modifications would come within the scope of the claims. For that reason, the following claims should be studied to determine their true scope and content.

The invention claimed is:
1. A fuel cell system comprising:
a cell stack assembly having a fluid flow passage and a flow field;
a heat exchanger portion arranged in the fluid flow passage and including a coolant flow passage, the fluid flow and coolant flow passages configured to transfer heat between one another and condense acid from a fluid flow in the fluid flow passage, the heat exchanger portion includes first and second heat exchanger portions; and
a mist trap arranged between the first and second heat exchanger portions, the mist trap configured to collect the acid and prevent the acid from flowing into the second heat exchanger portion.

2. The fuel cell system according to claim 1, wherein the heat exchanger comprises a condenser including a collector, the first heat exchanger portion configured to condense a first portion of a fluid within the fluid flow passage and provide the first portion to the collector, and the second heat exchanger portion configured to condense a second portion of the fluid, the first portion having a first dew point and the second portion having a second dew point that is lower than the first dew point.

3. The fuel cell system according to claim 2, wherein the first portion includes acid and the second portion is water.

4. The fuel cell system according to claim 2, wherein the condenser includes a drain, the second heat exchanger portion configured to provide the second portion to the drain, and the second portion is water.

5. The fuel cell system according to claim 1, wherein the first heat exchanger portion including a first corrosion-resistant material and the second heat exchanger portion including a second corrosion-resistant material that is less corrosion resistant than the first corrosion-resistant material.

6. The fuel cell system according to claim 5, wherein the first corrosion-resistant material is a coating that is arranged on a substrate, and the second corrosion-resistant material is the substrate.

7. The fuel cell system according to claim 5, wherein the coolant flow passage includes multiple tubes, and the fluid flow passage includes multiple spaced apart fins supporting the tubes.

8. The fuel cell system according to claim 7, wherein the fins are arranged parallel to one another and the tubes are arranged transverse to the fins.

9. The fuel cell system according to claim 7, wherein both the first and second heat exchanger portions include at least some of the tubes.

10. The fuel cell according to claim 1, comprising a collector configured to collect the acid in the heat exchanger portion.

11. The fuel cell according to claim 10, comprising a sprayer fluidly connected to the collector and configured to introduce the acid into a gas stream that is upstream from and in fluid communication with the flow field.

12. The fuel cell system according to claim 10, wherein the collector is a tray arranged beneath the heat exchanger portion.

13. The fuel cell system according to claim 10, wherein the collector includes an acid-neutralizing material.

14. The fuel cell system according to claim 13, wherein the collector is configured to produce water, the collector in fluid communication with a water return passage that is configured to receive the water.

15. The fuel cell system according to claim 13, wherein the collector comprises a tray arranged beneath the heat exchanger portion, the tray in fluid communication with a sprayer through an acid return line, the sprayer configured to introduce acid to a gas stream.

16. The fuel cell according to claim 13, wherein the acid-neutralizing material is a piece of sacrificial metal.

17. A fuel cell system comprising:
a cell stack assembly having a fluid flow passage and a flow field;
a heat exchanger portion arranged in the fluid flow passage and including a coolant flow passage, the fluid flow and coolant flow passages configured to transfer heat between one another and condense acid from a fluid flow in the fluid flow passage, wherein the heat exchanger portion comprises a first heat exchanger portion and a second heat exchanger portion;
a collector configured to collect the acid in the heat exchanger portion, wherein the collector includes an acid-neutralizing material, the collector comprising a mist trap arranged between the first and second heat exchanger portions and configured to prevent the acid from flowing into the second heat exchanger portion; and
a sprayer fluidly connected to the collector and configured to introduce the acid into a gas stream that is upstream from and in fluid communication with the flow field.

18. A fuel cell system comprising:
a cell stack assembly having a fluid flow passage and a flow field;
a heat exchanger portion arranged in the fluid flow passage and including a coolant flow passage, the fluid flow and coolant flow passages configured to transfer heat between one another and condense acid from a fluid flow in the fluid flow passage, wherein the heat exchanger portion comprises a first heat exchanger portion and a second heat exchanger portion, the first heat exchanger portion including a first corrosion-resistant material and the second heat exchanger portion including a second corrosion-resistant material that is less corrosion resistant than the first corrosion-resistant material;
a collector configured to collect the acid in the heat exchanger portion, wherein the collector is a tray arranged beneath the heat exchanger portion;
a sprayer fluidly connected to the collector and configured to introduce the acid into a gas stream that is upstream from and in fluid communication with the flow field; and
a mist trap arranged between the first and second heat exchanger portions, the mist trap configured to collect the acid and prevent the acid from flowing into the second heat exchanger portion.

\* \* \* \* \*